2,872,323

NEW METHOD OF PRODUCING WATER SOLUBLE COFFEE CONCENTRATE

Ramon Perech, New York, N. Y.

No Drawing. Application March 11, 1958
Serial No. 720,543

13 Claims. (Cl. 99—71)

The present invention relates to a new improved method of producing a dry, water soluble coffee concentrate, known by the popular name of instant coffee.

All the variations of instant coffee, available on the market, differ from freshly roasted coffee due to lack of flavor and aroma, which is of freshly roasted coffee beans.

My method, as described below, assures that the instant coffee, made according to this invention produces, when dissolved in water, a coffee beverage having the best aroma and flavor, results.

One familiar with the steps required to produce instant coffee, as it is generally made from roasted coffee beans, understands why all the variations of instant coffee on the market have lost their flavor and aroma which the coffee beans acqu'red when the raw beans were roasted, and why the instant coffee on the market quite often has a tang of roasted hay.

It is a fact that the coffee beans acquire their specific coffee flavor and aroma only after the coffee beans are roasted, by exposing the raw coffee beans to the action of heat of some 250° C., or even higher.

Among the water soluble constituents of raw coffee beans some 70 to 75% soluble solids are accounted for by protein, caffeine, tannin-chlorogenic acids, sucrose, fats, etc. On the dry basis there are some 8.62% of sucrose, some 9.2% of tannin-chlorogenic compounds, some 17% fats, 1.20 to 1.31% of caffeine, etc.

See "Report of Investigation of Coffee," by Dr. S. C. Prescott, of Massachusetts Institute of Technology, published by the National Coffee Research Association, in New York, N. Y.

Caffeine, quantatively, is a minor component of coffee beans, yet it is appreciated for its stimulating and diuretic properties, whereas sucrose, tannin-chlorogenic compounds and fats are the important constituents which originate the flavor, aroma, color—the properties most appreciated by consumers of coffee beverages.

When coffee beans are fully roasted, of some 8.62% of the original sucrose only 0.8% remains in the roasted coffee beans. Most of the sucrose seems to disappear in the early roast. Apparently reducing sugars are first formed. These reducing sugars, in turn, react rapidly so that the total amount of sugar decreases rapidly at first and more slowly throughout the roast. The sugar reactions seem to be dehydration and polymerization reactions. In place of the natural sugars and simple reducing sugars, high molecular water soluble and water insoluble materials are formed. It is believed that much of the special flavor and aroma of roasted coffee beans is due to the reducing sugars and to a volatile oily compound, known as caffeol.

Caffeol is formed as result of complex chemical changes developed during the roasting of raw coffee beans.

The tannin-chlorogenic compounds are considered contant constituents of coffee beans, and it is really amazing that until now, neither the coffee industry nor research institutions have given adequate attention to the importance of the tannin-chlorogenic constituents of the coffee beans, as a potential source for creating an appreciable flavor in coffee, particularly in instant coffee which, as many consumers of instant coffee complain, often has a tang of roasted hay.

In my experimental work I ascertained that about 9.2% of tannin chlorogenic compounds in the coffee beans, when oxidized, greatly contribute to the improvement of the qualities of the coffee beverage, made from instant coffee. Apparently, when the tannin-chlorogenic compounds are oxodized in an aqueous solution, they provide the coffee beverage with a very agreeable astringency and also contribute a much better color to the instant coffee, when it is dissolved—properties much appreciated by coffee consumers.

According to the usual method now known in the industry for producing instant coffee, the coffee beans, as available on the market, are roasted and ground, and the water soluble constituents of roasted and ground coffee beans, are extracted by hot water, steam, etc. After the insoluble parts of the ground coffee beans are separated from the resulting solution, the excess water in the solution is then evaporated. The evaporation of the excess water in the solution is usually made under vacuum whereby together with initially evaporated water, first of all the volatile aromatic substances, which form the flavor in the roasted coffee beans are distilled off, and the resultant coffee concentrate loses substantially all traces of flavor and aroma, which characterizes roasted coffee beans.

Any one familiar with the steps of processing coffee beans knows that the coffee tree's fruits, also called cherries, which, when ripe, are of deep purple-crimson color, contain sealed within them the so called coffee beans. In order to remove the coffee beans from the cherries, they are broken or pulped, and the coffee beans are separated from the thick outer skins and the mucilaginous substance adhering to the skin.

After the broken outer skins and the mucilaginous substance are separated from the pulped mass, the coffee beans remain enclosed in parchment-like coats (enclosures), and are covered with some tiny spermoderms, which, according to their color, are called silver skins.

In the modern industrial manner of processing the extracted coffee beans on the plantations, from the moment the beans are extracted from the cherries, they are submitted to several separate crude treatments, including fermentation in water. After fermentation, the beans, still enclosed in their parchment-like mass, are dried by exposing them to artificial heat on barbecues, on trays, etc. Then in order to separate the beans from the dried parchment-like substances, they are passed through especially constructed equipment and the dried tiny particles are thereafter winnowed off. Finally the silver skins on the coffee beans are rubbed off by friction, and after curing and polishing, the coffee beans are given the look of the dry coffee beans as they are known on the market. In the course of these treatments, some 8 to 10% of the harvested coffee beans are either broken or otherwise damaged and therefore regarded as waste.

An important practical step in my process of making instant coffee involves the use of raw and unprocessed coffee beans, picked from the trees, even before they are separated from their parchment-like enclosures, known as coats, rather than the dry coffee beans as they are known on the market, after they are roasted.

As a result of experimental research I have found that it is possible to produce a perfect, water soluble coffee concentrate by extracting the water-soluble constituents not only from the dry processed and oven roasted coffee beans, but also from the freshly harvested beans. As used, the unroasted beans are decorticated by mechanical or other means whereby the beans are separated from the pulpy mass of the cherries, including the outer skins and mucilage, but are still enclosed in their natural parchment-like coats and are still covered by their spermoderm, known as silver skins.

When the coffee beans, within their parchment-like coats, are separated from the mucilage, some sticky remnants of the mucilage still cling to the coats. In order to eliminate this sticky mucilage, I submit the coffee beans, still within their parchment-like enclosures, to intensive rinsing in water, until the sticky remnants of mucilage are liquefied and dissolved in the water wherein they are rinsed.

After the water is entirely drained off, I comminute the coffee beans, together with their parchment-like coats, into a disintegrated homogeneous mass, then I extract by either water or steam, the water soluble constituents of the disintegrated coffee beans.

The second and most important step in my processing of the raw coffee beans involves the oxidation of the water soluble constituents of the coffee beans, especially the tannin-chlorogenic compounds in an aqueous solution, by exposing the solution to the action of oxygen in an oxygenous atmosphere, such as the oxygen of the air, for at least one hour. The oxidation is most effectively obtained in the presence of an innocuous inorganic oxidizing catalyst. Potasium permanganate is used to particular advantage, with the result that, when the extracted water-soluble constituents are oxidized in aqueous medium and converted into instant coffee, the instant coffee acquires a superior aroma and flavor, and an agreeable astringency. The resulting beverage is reddish brown in color.

Oxidation is most effectively obtained when the oxidizing catalyst is introduced into the solution, and the solution is exposed for oxidation, under continuous heating for one hour or longer, preferably at a temperature of some 15 to 20° C. below the boiling point of water, but not lower than about 30° C. until, as determined by a qualified coffee tester, the solution has acquired the desired degree of astringency.

During my experimental research work I also performed oxidation, as described above of the water soluble constituents of already processed dry, raw coffee beans. I also oxidized the extracted water-soluble constituents of already roasted coffee beans in aqueous medium. The instant coffee made from previously processed dry coffee beans, as well as from the roasted coffee beans, was of much higher quality than instant coffee from coffee solids, which had not been oxidized in aqueous solution, but the best instant coffee was produced from the water soluble constituents of coffee beans freshly picked from the coffee trees, even when still enclosed in their parchment like coats.

Among the extracted water-soluble constituents of raw coffee beans is some albumen which, when dissolved in water, and submitted to evaporation under vacuum, causes the solution to foam. According to my process, the aqueous solution, before submitting it to evaporation, is heated during oxidation at temperatures approaching the boiling point of water, whereby the albumen coagulates and even becomes condensed with other constituents in solution. In this way no foaming, which may interfere with evaporation, can take place.

After the oxidation is performed, I submit the solution to evaporation under vacuum to remove the excess water in the solution until a concentration appropriate for spray drying is obtained.

As variation in the oxidation of the extracted water-soluble constituents of coffee beans in an aqueous solution, as described above, I do not introduce the catalyst into the solution, but as soon as the insoluble parts of the coffee beans are separated from the solution, I submit—at once—the solution to evaporation under vacuum, until the still unoxidized solution is concentrated into a consistency appropriate for spray drying. Only after such still unoxidized concentrate is formed, I introduce into the concentrate thus formed an innocuous oxidizing catalyst, preferably potasium permanganate in a proportion of some 0.01 to 0.03% by weight on dry basis of the tannin-chlorogenic compounds in the concentrate, and expose the concentrate to oxidation in an oxygenous atmosphere under continuous heating at temperatures not lower than 30° C. until, as determined by a qualified coffee tester, the concentrate is properly oxidized and has acquired the desired degree of astringency.

Unlike the usual methods of spray drying as customarily used in the industry, involving spray drying the roasted coffee extract concentrate into a dry powder under conventional high temperatures, I perform the spray drying of the concentrate in a manner so that the heat utilized for spray drying of the extracted water-soluble constituents of raw coffee beans does not produce any chemical changes in the solids of the coffee concentrate. Therefore, the spray drying is preferably performed in the lowest possible technically admissible temperature, where the temperature at the outlet of the spray drying chamber does not exceed some 60° C. In this way the powdered coffee solids leave the spray drying chamber chemically unaffected.

An additional more adequate cooling of the solids inside the spray drying chamber was accomplished by admitting atmospheric or conditioned air into the spray drying chamber via a side inlet, thus assuring that the sucrose is not converted into reducing sugar. No caffeol is formed, and the only physical change taking place is that the coffee solids in the still wet concentrate, are converted into a powdery state.

When processing an unroasted coffee, after the powdered coffee extract is produced, I expose it to the action of high coffee roasting temperatures, usually applied in the industry. Thus, only at this time, the caffeol is formed, the sucrose becomes converted into reducing sugar, and the roasted powdered coffee concentrate thereby acquires the flavor and aroma of freshly roasted coffee beans.

As the instant coffee produced from unroasted coffee according to my method acquires flavor and aroma only in the final step of production, when it has to undergo no further processing and is packed immediately into closed containers, the flavor and aroma developed during roasting, the last step of processing, remains with the final product for good.

While the catalyst emphasized in the foregoing examples is disclosed as potassium permanganate, it should be understood that other innocuous oxidation catalysts may be applied to develop the same or kindred qualities in coffee extract. For example, hydrogen peroxide or copper (cupric) oxide has been proven capable of developing substantially the same quality of instant coffee, but copper oxide is not considered acceptable from the standpoint of food technology. On the other hand hydrogen peroxide, when added to an aqueous solution of coffee extracts and submitted to continuous heating at elevated temperature is subject to sudden decomposition.

It is important to know that the raw coffee beans contains some 3.5 to 4.41% of inorganic matter, of which some 58.48% is potassium monoxide ($K_2O$) and 1.45% is manganic oxide ($Mn_2O_3$). Thus by introducing minute quantities of potassium permanganate, I introduce no foreign matter, as potassium as well as manganese are natural constituents of coffee beans.

(See "Chemical Zusammensetzung der Menschlichen Nahrungsund Genussmittel" by Dr. Joseph Koenig, vol. 2 page 378, and also "Chemistry of Coffee" by Dr. Ernest Lockhard, of the Coffee Brewing Institute of America, as well as the "Bulletin of the French Academy of Science," 1954, pages 1853 and 1854.)

The scope of the invention will be fully understood from the description set forth in the following examples:

Example 1

In order to extract the coffee beans from the cherries, I break them and separate the coffee beans from the mass of broken skin and mucilage. At this time, the coffee beans are covered by parchment-like coats, and some sticky remnants of mucilage still cling to the coats. These coats with the beans still inside, are intensively washed in water until the remnants of the sticky remnants are liquefied and dissolved in the water.

After the water is fully drained off, I disintegrate the coffee beans, together with their parchment-like coats, in which they are enclosed, into a homogeneous comminuted mass and extract from the formed mass its water-soluble constituents by any method known in the industry for extracting water soluble constituents from coffee beans.

After the insoluble parts of the coffee beans are separated from the solution, I introduce into the solution of the water-soluble constituents of the coffee beans, an inorganic oxidizing catalyst, calculated as some 0.01 to 0.03% of dry weight of the tannin-chlorogenic compounds in the solution. Among other oxidizing catalysts I usually prefer to use potassium permanganate.

I expose the solution containing the catalyst to oxidation in an oxygenous atmosphere, preferably to the action of oxygen of the air, under continuous heating at a temperature below the boiling point of water, but not lower than 30° C. (86° F.) for at least one hour until, as determined by a qualified tester, the solution acquires the desired degree of astringency. The period of time during which the solution is to be exposed to oxidation under continuous heating, and the percentage of the catalyst applied, may be increased or decreased, depending upon the chemical composition of the individual batch and source of the coffee beans submitted to processing.

When reducing the solution to the required spray drying consistency, and in eliminating the excess of water in the solution, I submit the solution to evaporation, preferably under vacuum until the concentrate attains the consistency suitable for spray drying the concentrate into a powder.

Contrary to the methods customarily used in the industry when spray drying the coffee concentrate to form a powder under elevated temperatures, I spray-dry the concentrate into a powder under the lowest technically admissible temperatures, whereby spray drying is carried out in such a way that the applied temperature causes no chemical changes in the solids of the coffee concentrate. I obtained very satisfactory results when I spray dried the coffee concentrate at a temperature at the outlet of spray drying chamber of some 55 to 60° C. whereby no reducing sugar and no caffeol were formed.

A cooling of the solids particles during the spray drying provides an additional assurance that no chemical changes will take place. I accomplished additional cooling of solids inside the spray drying chamber by admitting atmospheric or conditioned air directly into the spray drying chamber through a side inlet, and established that no reducing sugar and no caffeol were formed.

Only after the thus chemically unchanged coffee extract is produced in powder form, I expose the powder to the action of high temperature, generally applied for roasting of coffee beans, until the chemical and physical changes, common to roasting of coffee beans, are completed. In this way, most of the sucrose in the powder is degraded into reducing sugar, caffeol is formed, and the flavor and aroma characteristic of freshly roasted coffee beans are developed in the roasted powdered coffee extract.

By the method of producing instant coffee, described in this example, the flavor and aroma are developed in the last step of processing, and as the instant coffee does not undergo any further processing and is directly packed into closed containers, the flavor and aroma which are developed by exposing the powdered coffee extract at elevated temperatures, remain with the final product for good.

Example 2

I disintegrate a batch of processed raw dry beans, as they are obtainable on the market, into a homogeneous comminuted mass and extract by water or steam, from the mass the water-soluble constituents of the disintegrated coffee beans. After the insoluble parts of the beans are separated from the solution, I introduce into the formed solution of the water-soluble constituents of the coffee beans an innocuous inorganic oxidizing catalyst, and expose the solution for oxidation to the action of oxygen of the air under continuous heating at temperatures below the boiling point of water, but not lower than 30° C. (86° F.) until, as determined by a qualified coffee tester, the solution is oxidized to the required degree and has acquired the agreeable astringency. After the oxidation is completed, the solution is submitted to evaporation into the consistency appropriate for spray drying. The concentrate obtained is spray dried into a powder and finally the powder is roasted under conditions described in the foregoing Example 1.

Example 3

I extract the water-soluble constituents of already roasted coffee beans by the methods of extraction known in the industry. After the insoluble parts of the disintegrated roasted coffee beans are separated from the solution, I introduce into the solution for oxidation, as catalyst, an innocuous oxidizing inorganic catalyst substance, preferably potassium permanganate, and expose the solution for oxidation to the action of oxygen in any oxygenous atmosphere under continuous heating at a temperature not lower than 30° C. (86° F.) until, as determined by a qualified coffee tester, the solution is adequately oxidized and has acquired an agreeable slight astrigency. After the solution is submitted to evaporation to drive off excess water in the solution, the resultan concenrate is spray-dried into a powder under elevated temperatures customarily used in the coffee industry.

Example 4

In a variation of the methods described in the foregoing examples for oxidation of water soluble constituents of raw and roasted coffee beans in aqueous solution, I do not introduce the oxidizing catalyst immediately into the formed solution, but rather, as soon as the insoluble parts of the coffee beans are separated from the solution, I exclude the air—at once—from the vessel, containing the solution, and submit the solution to vacuum evaporation to remove excess of water until the consistency appropriated for spray drying is attained. Only after such consistency is reached, but the concentrate is still unoxidized, I introduce into the concentrate the oxidizing substance and expose the resulting concentrate to oxidation in an oxygeneous atmosphere, at temperatures below the boiling point of water, but not lower t' an 30° C., and finally perform the spray drying of the concentrate into a powder and the roasting of the powder in the manner, such as described in the foregoing examples.

Example 5

In variation of the way described in the foregoing examples I perform the oxidation of the water soluble constituents of the disintegrated coffee beans, when the insoluble parts of the coffee beans are not separated from the produced solution, but I leave the insoluble parts in the solution, and expose the solution to the action of oxygen of any available oxygenous atmosphere under constant heating at elevated temperature lower than the boiling point of water until by determination of a qualified coffee tester the solution is adequately oxidized. Then I separate the insoluble parts and submit the solution to concentration, spray-drying and roasting in the ways described in the foregoing Examples 1, 2, and 4.

The definition "oxygeneous atmosphere" includes also oxygen of the air.

This application is a continuation-in-part of my co-pending applications Serial No. 658,009, filed May 8, 1957, and Serial No. 691,533, filed October 22, 1957.

It should be understood that the foregoing general description and examples are illustrative, and the details set forth therein may be modified without departing from the scope or the spirit of the invention, which is intended to be defined in the following claims.

What I claim is:

1. A process for preparing an improved water soluble oxidized coffee extract, which comprises preparing a water extract from disintegrated coffee beans and heating the formed aqueous extract at an elevated temperature below the boiling point of water in contact with an oxygenous atmosphere for at least one hour and until water soluble constituents of the coffee are oxidized in the aqueous extract medium.

2. A process for preparing an improved water soluble oxidized coffee extract, which comprises preparing a water extract from disintegrated coffee beans, heating the formed aqueous extract at an elevated temperature below the boiling point of water in contact with an oxygenous atmosphere for at least one hour and until water soluble constituents of the coffee are oxidized in the aqueous extract medium, and removing water from the oxidized aqueous extract to form water soluble oxidized coffee extract in the solid phase.

3. A process for preparing an improved water soluble oxidized coffee extract, which comprises preparing a water extract from disintegrated coffee beans, introducing an innocuous inorganic oxidation catalyst into said water, and heating the formed aqueous extract at an elevated temperature below the boiling point of water in contact with an oxygenous atmosphere for at least one hour and until water soluble constituents of the coffee are oxidized in the aqueous extract medium.

4. A process for preparing an improved water soluble oxidized coffee extract, which comprises preparing a water extract from disintegrated unroasted coffee beans, heating the formed aqueous extract at an elevated temperature below the boiling point of water in contact with an oxygenous atmosphere for at least one hour and until water soluble constituents of the coffee are oxidized in the aqueous extract medium, removing water from the oxidized aqueous extract to form water soluble oxidized coffee extract in the solid phase, and roasting the coffee solids at coffee roasting temperatures.

5. A process for preparing an improved water soluble oxidized coffee extract, which comprises preparing a water extract from disintegrated raw coffee beans still contained in their parchment-like coats, heating the formed aqueous extract at an elevated temperature below the boiling point of water in contact with an oxygenous atmosphere for at least one hour and until water soluble constituents of the coffee are oxidized in the aqueous extract medium, separating water insoluble ingredients from the oxidized aqueous extract, removing water from the oxidized aqueous extract to form water soluble oxidized coffee extract in the solid phase, and roasting the coffee solids at coffee roasting temperatures.

6. A process for producing an improved water soluble oxidized coffee extract, which comprises the following steps (1) preparing a water extract from disintegrated coffee beans, (2) concentrating the aqueous extract to a spray dryable concentrate, (3) heating the aqueous extract at an elevated temperature below the boiling point of water for at least one hour in contact with an oxygenous atmosphere and until water soluble constituents of the coffee are oxidized in the aqueous extract medium, and (4) spray drying said concentrate at terminal temperatures not substantially exceeding 60° C.

7. A process for producing an improved water soluble oxidized coffee extract, which comprises the following steps (1) preparing a water extract from disintegrated unroasted coffee beans, (2) concentrating the aqueous extract to a spray dryable concentrate, (3) heating the aqueous extract in the presence of added quantities of potassium permanganate at an elevated temperature below the boiling point of water for at least one hour in contact with an oxygenous atmosphere and until water constituents of the coffee are oxidized in the aqueous extract medium, (4) spray drying said concentrate at terminal temperatures not substantially exceeding 60° C., and (5) roasting the solids at coffee roasting temperatures.

8. A process for preparing an improved water soluble oxidized coffee extract, which comprises preparing a water extract from disintegrated roasted coffee beans, introducing an innocuous inorganic oxidation catalyst into said water, heating the formed aqueous extract at an elevated temperature below the boiling point of water in contact with an oxygenous atmosphere for at least one hour and until water soluble constituents of the coffee are oxidized in the aqueous extract medium, and removing water from the oxidized aqueous extract to form water soluble oxidized coffee extract in the solid phase.

9. A process for preparing a water soluble solid oxidized coffee extract, which comprises removing the outer skin and the mucilaginous layer from coffee cherries substantially as they come from the coffee trees, disintegrating the resulting coffee beans, preparing a water extract from the disintegrated coffee beans, heating the formed aqueous extract at an elevated temperature below the boiling point of water in contact with an oxygenous atmosphere for at least one hour and until water soluble constituents of the coffee are oxidized in the aqueous extract medium, removing water from the oxidized aqueous extract to form water soluble oxidized coffee extract in the solid phase, and roasting the coffee solids at coffee roasting temperatures.

10. A process for preparing a water soluble solid oxidized coffee extract, which comprises removing the outer skin and the mucilaginous layer from coffee cherries substantially as they come from the coffee trees, disintegrating the resulting coffee beans, preparing a water extract from the disintegrated coffee beans, introducing an innocuous inorganic oxidation catalyst into said water, heating the formed aqueous extract at an elevated temperature below the boiling point of water in contact with an oxygenous atmosphere for at least one hour and until water soluble constituents of the coffee are oxidized in the aqueous extract medium, removing water from the oxidized aqueous extract to form water soluble oxidized coffee extract in the solid phase, and roasting the coffee solids at coffee roasting temperatures.

11. A process for preparing an improved water soluble coffee extract, which comprises the following steps (1) preparing an aqueous extract from disintegrated unroasted coffee beans, (2) heating the aqueous extract in the presence of added quantities of an innocuous oxidation catalyst at elevated temperatures below the boiling point of water in contact with an oxygenous atmosphere for at least one hour and until water soluble constituents of the coffee are oxidized in the aqueous extract medium, (3) evaporating the aqueous extract to a spray dryable concentrate, (4) spray drying said concentrate at temperatures below those at which sucrose in the aqueous solution is converted into reducing sugars, and (5) roasting the spray dried solids at coffee roasting temperatures.

12. A process for preparing an improved water soluble oxidized coffee extract, which comprises preparing a water extract from disintegrated unfermented coffee beans, separating water insoluble constituents from the solution, heating the formed aqueous extract at elevated temperatures below the boiling point of water in presence of added innocuous oxidation catalyst and in contact with an oxygenous atmosphere until water soluble constituents of the unfermented coffee beans are oxidized in the aqueous medium, removing water from the oxidized aqueous extract to form coffee extract in the solid phase under temperatures such that the sucrose in solution is not converted into reducing sugars and caffeol is not formed, and roasting the coffee solids at coffee roasting temperatures.

13. A water soluble oxidized coffee extract produced by the process of claim 12.

References Cited in the file of this patent

UNITED STATES PATENTS

| | | |
|---|---|---|
| 95,015 | Galloway | Sept. 21, 1869 |
| 250,099 | Phillips | Nov. 29, 1881 |
| 250,100 | Phillips | Nov. 29, 1881 |
| 1,175,490 | Vietinghoff | Mar. 14, 1916 |
| 1,932,769 | Copes | Oct. 31, 1933 |
| 1,933,049 | Copes | Oct. 31, 1933 |
| 2,758,927 | Chase | Aug. 14, 1956 |

UNITED STATES PATENT OFFICE
CERTIFICATE OF CORRECTION

Patent No. 2,872,323     February 3, 1959

Ramon Perech

It is hereby certified that error appears in the printed specification of the above numbered patent requiring correction and that the said Letters Patent should read as corrected below.

Column 1, line 20, after "which is" insert -- characteristic --; column 2, line 11, for "oxodized" read -- oxidized --; column 3, line 22, for "con tituents" read -- constituents --; line 28, for "Pota sium" read -- Potassium --; line 40, for "unt l" read -- until --; line 45, for "con tituents" read -- constituents --; column 4, line 25, for "owdered" read -- powdered --; column 6, line 43, for "concenrate" read -- concentrate --.

Signed and sealed this 28th day of July 1959.

(SEAL)
Attest:

CARL H. AXLINE
Attesting Officer

ROBERT C. WATSON
Commissioner of Patents